(12) United States Patent
Lu et al.

(10) Patent No.: US 7,957,284 B2
(45) Date of Patent: Jun. 7, 2011

(54) SYSTEM AND METHOD FOR OPTIMIZING NETWORK BANDWIDTH USAGE

(75) Inventors: Zanjun Lu, Edison, NJ (US); Sanjay Sharma, Wayne, NJ (US); Nitin Gogate, Montvale, NJ (US); David Solomon, River Vale, NJ (US)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 12/416,247

(22) Filed: Apr. 1, 2009

(65) Prior Publication Data

US 2010/0254409 A1 Oct. 7, 2010

(51) Int. Cl.
*H04L 1/00* (2006.01)

(52) U.S. Cl. ......................................... 370/230; 370/235

(58) Field of Classification Search .................. 370/468, 370/236, 392, 400
See application file for complete search history.

(56) References Cited

U.S. PATENT DOCUMENTS

| | | | |
|---|---|---|---|
| 7,486,697 B2 | 2/2009 | Fernandes et al. | |
| 2005/0271084 A1* | 12/2005 | Bruckman et al. | 370/468 |
| 2006/0251074 A1* | 11/2006 | Solomon | 370/392 |
| 2008/0056135 A1* | 3/2008 | Lee et al. | 370/236 |
| 2008/0291919 A1 | 11/2008 | Dunbar et al. | |
| 2008/0291927 A1* | 11/2008 | Yong et al. | 370/400 |

OTHER PUBLICATIONS

IEEE standard: IEEE 802.3-2005 Clause 43, pp. 285-349, 2005.

* cited by examiner

*Primary Examiner* — Kwang B Yao
*Assistant Examiner* — Syed M Bokhari
(74) *Attorney, Agent, or Firm* — Baker Botts L.L.P.

(57) ABSTRACT

A method of optimizing bandwidth usage in a link aggregated network includes identifying available bandwidth on a plurality of data links in a link aggregation group, selecting the data link with the least available bandwidth, and determining whether the available bandwidth of the selected data link is less than a guaranteed bandwidth of an incoming data flow. If the available bandwidth of the selected data link is less than the guaranteed bandwidth of the incoming data flow, the method includes selecting the data link with the next least available bandwidth and repeating the previous steps until the available bandwidth of the selected data link is greater than the guaranteed bandwidth of the incoming data flow. The method further includes assigning the data flow to the data link determined to have an available bandwidth greater than the guaranteed bandwidth of the incoming data flow.

20 Claims, 6 Drawing Sheets

SYSTEM AND METHOD FOR OPTIMIZING NETWORK BANDWIDTH USAGE

TECHNICAL FIELD

This invention generally relates to computer networking systems and more particularly to a system and method for optimizing bandwidth usage through link aggregation.

BACKGROUND

Link aggregation, referred to in IEEE 802.3ad, is a method of using multiple ethernet network ports in parallel in order to increase the link speed for enhanced data transfer. The aggregated links provide an increased link speed by combining the limited link speeds of each single ethernet port. Link aggregation also provides increased redundancy for greater availability.

In using link aggregation, various load balancing methods may be employed to appropriately distribute data traffic flow. A common load balancing method for distributing traffic in a network is the use of hashing algorithms. Many telecommunications chip and equipment vendors use hashing algorithms to distribute data traffic over link aggregated ports. The hashing algorithm is a mathematical function for transforming data into a related integer such as in a look-up table or a database. For example, the destination address and the source address of the data packet may be used as a hash key to a hashing function to derive the port on which a traffic flow may be directed. However, it is problematic that such hashing algorithms do not provide any consideration for bandwidth guarantee and primarily rely on statistical distribution to direct traffic flows.

SUMMARY

In one embodiment, a method of optimizing bandwidth usage in a link aggregated network includes identifying available bandwidth on a plurality of data links in a link aggregation group, selecting the data link with the least available bandwidth, and determining whether the available bandwidth of the selected data link is less than a guaranteed bandwidth of an incoming data flow. If the available bandwidth of the selected data link is less than the guaranteed bandwidth of the incoming data flow, the method includes selecting the data link with the next least available bandwidth and repeating the previous steps until the available bandwidth of the selected data link is greater than the guaranteed bandwidth of the incoming data flow. The method further includes assigning the data flow to the data link determined to have an available bandwidth greater than the guaranteed bandwidth of the incoming data flow.

In another embodiment, a method of optimizing bandwidth usage in a link aggregated network includes identifying available bandwidth on a plurality of data links in a link aggregation group, selecting the data link with the most available bandwidth, and determining whether the available bandwidth of the selected data link is less than a guaranteed bandwidth of an incoming data flow. If the available bandwidth of the selected data link is less than the guaranteed bandwidth of the incoming data flow, the method includes adjusting the bandwidth of the selected data link with the oversubscription factor, such that the adjusted bandwidth of the selected data link may be configured to accept the incoming data flow, determining whether the oversubscribed bandwidth of the selected data link is greater than the guaranteed bandwidth of the incoming data flow, and, if the oversubscribed bandwidth of the selected data link is greater than the guaranteed bandwidth of the incoming data flow, assigning the data flow to the selected data link. If the available bandwidth of the selected data link is greater than or equal to the guaranteed bandwidth of the incoming data flow, the method includes assigning the data flow to the selected data link.

DETAILED DESCRIPTION

Link aggregation algorithms may employ various load balancing methods to appropriately distribute data traffic flow. Hashing algorithms are often used to distribute data traffic over link aggregated ports. Hashing algorithms often result in one or more links in the group of aggregated ports to become overloaded, while other links within the group may be underutilized. As a result, the hashing methods are not configured to guarantee the committed bandwidth for each flow. The link utilization may be low and the best effort traffic may not be enabled to use the underutilized links. Therefore, there is a need for an algorithm to direct traffic flows on a link aggregated group. The link aggregation technique would be configured to assign a flow constituent link wherein: the committed bandwidth will be guaranteed, the link utilization will be high, and the best effort traffic will be more likely to receive the uncommitted bandwidth.

Figure 1:
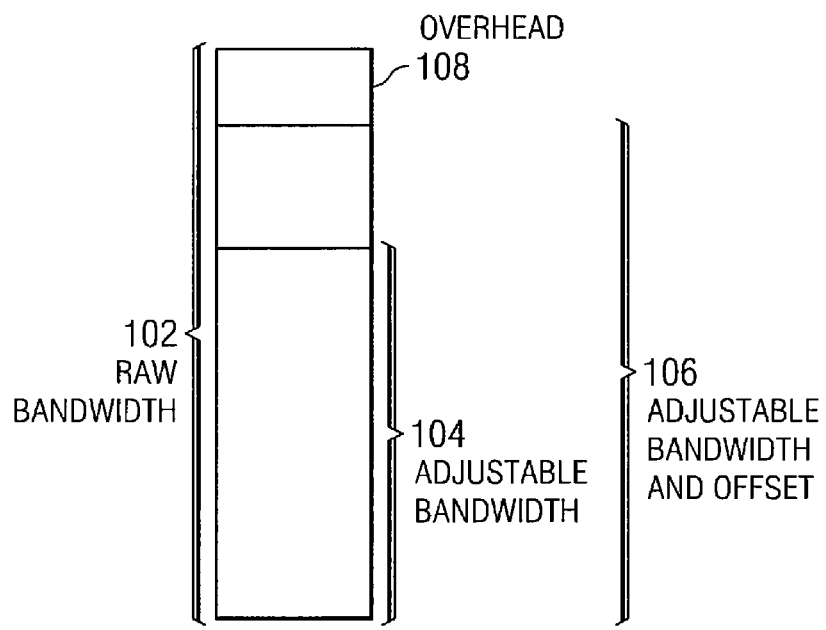
FIG. 1 illustrates a diagram of a bandwidth adjustment process for a worst case packet size on a data link.

FIG. 1 illustrates a diagram of a bandwidth adjustment process for a worst case packet size (a.k.a. incoming data flow) on a data link, such as an ethernet link. Raw bandwidth 102 represents the physical bandwidth of the data link. A data packet, occupying the maximum available raw bandwidth, includes overhead 108 and adjusted bandwidth 104. Overhead 108 includes frame header information. The frame header information includes packet address data, such as a source MAC address, a destination MAC address, and a virtual LAN ID. Adjusted bandwidth 104 provides a committed information rate of a particular data flow on a link. The committed information rate (CIR) is the average bandwidth guaranteed of an incoming data flow. In some cases, adjusted bandwidth 104 may provide an excess information rate (EIR), which is used to provide an allowance of burstable bandwidth transmitted over the link. Adjusted bandwidth and offset 106 provides the bandwidth after the oversubscription factor offset of the worst case packet size. An oversubscription factor is a ratio of the configured admissible bandwidth of a port to the guaranteed bandwidth of the port. This factor is typically set by the operator taking into account any known traffic statistics, traffic patterns, and fixed overhead associated with a network interface. The guaranteed bandwidth of a port is the bandwidth remaining after excluding the bandwidth used by fixed overhead based on the smallest data packet size. The effect of the fixed overhead is the greater for smaller data packets. The percentage effect of fixed overhead diminishes with larger date packets (i.e., longer frames). Since the actual traffic is a mix of packets of various sizes, the system allows the operator to compensate for small packet inefficiencies by specifying an oversubscription factor. In one embodiment, the adjusted bandwidth of the data packet and the offset 106 may be a factor of 1.2 times the size of the adjusted bandwidth 104, in order to allocate the appropriate physical bandwidth for the incoming data flow.

Figure 2:
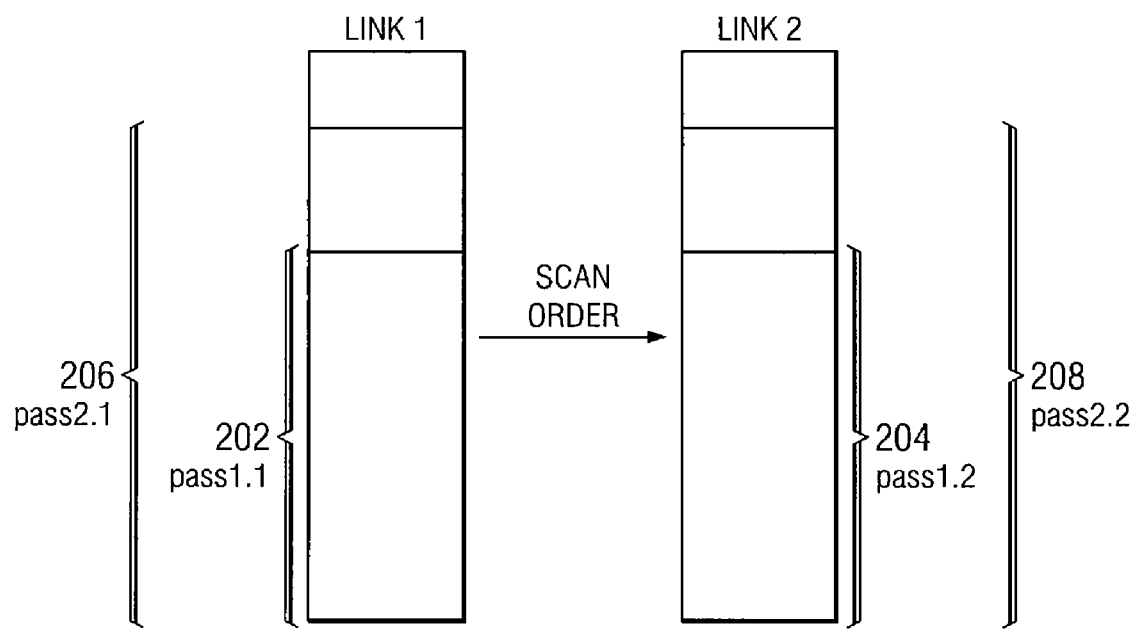
FIG. 2 illustrates a diagram of a two-pass flow bandwidth allocation algorithm.

FIG. 2 illustrates a diagram of a two-pass flow bandwidth allocation algorithm. At step 202, a first attempt (a.k.a. "pass 1.1") is made to assign a data packet to link 1. During pass 1.1, the oversubscription factor is preferably set to a ratio of 1. If it is determined that during pass 1.1 that link 1 has available bandwidth to receive the data packet, the data packet is assigned to link 1. Otherwise, if it is determined that link 1 does not have available bandwidth to receive the data packet, the algorithm proceeds to scan link 2 for available bandwidth. At step 204, a first attempt (pass 1.2) is made to assign the data packet to link 2. During pass 1.2, the oversubscription factor remains to be set at a value of 1. If it is determined that during pass 1.2 that link 2 has available bandwidth to receive the data packet, the data packet is then assigned to link 2, with the oversubscription factor set at 1. Otherwise, at step 206, a second attempt (pass 2.1) is made to assign the data packet to link 1. At pass 2.1, the oversubscription factor is preferably increased to a value greater than 1 (for example 1.2 or 1.3), in order to allocate enough available bandwidth to accommodate the data packet, such as in a worst case scenario. If it is determined that during pass 2.1 that link 1 has available bandwidth to receive the data packet, the data packet is assigned to link 1 with a oversubscription factor greater than 1. Otherwise, if it is determined that link 1 does not have available bandwidth to receive the data packet, the algorithm proceeds to scan link 2 again for available bandwidth. At step 208, a second attempt (pass 2.2) is made to assign the data packet to link 2. At pass 2.2, the oversubscription factor is preferably set to a value greater than 1, in order to allocate enough available bandwidth to accommodate the data packet. If it is determined that during pass 2.2 that link 2 has available bandwidth to receive the data packet, the data packet is then assigned to link 2, with the oversubscription factor greater than 1. The two-pass bandwidth allocation embodiment of the algorithm described herein is merely an exemplary embodiment, and in other embodiments, additional passes may be employed.

Figure 3:
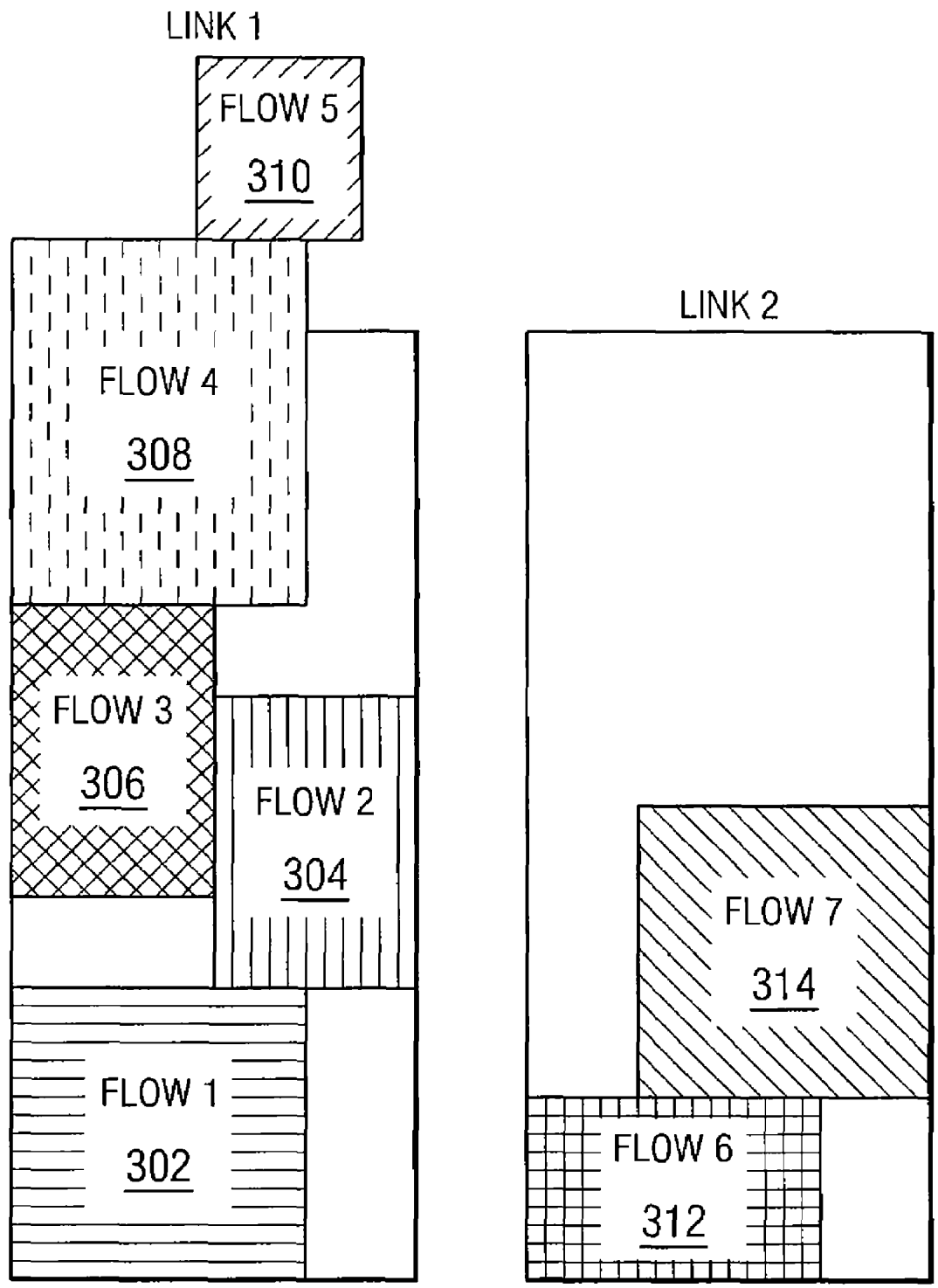
FIG. 3 illustrates a two-port embodiment of a bandwidth-blind algorithm.

FIG. 3 illustrates a two-port embodiment of an existing bandwidth-blind allocation algorithm. In a bandwidth-blind allocation algorithm, a data packet may be assigned to link without consideration of data fragmentation or efficient use of the available bandwidth. At step 302, a first data packet (a.k.a. "flow 1") is assigned to link 1. At step 304, data flow 2 is assigned to link 1. Next, at step 306, flow 3 is assigned. At the conclusion of step 306, link 1 still has some available bandwidth. At step 308, flow 4 is assigned to link 1 in this embodiment; however, at step 308, link 1 will become overloaded due to the bandwidth-blind assignment of the data packets. At step 310, flow 5 is assigned to link 1, which is overloaded. At step 312, data flow 6 is assigned to link 2, and at step 314, flow 7 is also assigned to link 2. In this embodiment, the remaining two data flows (flows 6 and 7) are is assigned to link 2, wherein link 2 has substantial available bandwidth and link 1 has no available bandwidth and is overloaded. Therefore, in assigning traffic to the links of a link aggregation group, each flow is assigned to a single link without consideration of data fragmentation or efficient use of the available bandwidth. Such bandwidth-blind allocation may be problematic.

The flow distribution process of particular embodiments the present invention is configured to direct incoming data flows on a plurality of link aggregation ports so as the eliminate or reduce the disadvantages that may be associated with bandwidth-blind allocation. This link aggregation technique is configured to direct traffic flows using: (i) a load balancing algorithm; or (ii) a minimizing fragmentation algorithm. The algorithms employ the CIR of each incoming data flow as an input to the appropriate flow distribution algorithm. The CIRs and the algorithms ensure that the data flows assigned to each data link will not exceed the link capacity and will efficiently use the bandwidth of the links. These algorithms may be performed by any suitable network nodes that receive and assign data flows. The algorithms may be implemented in such nodes using any suitable combination of hardware, firmware, and/or software of the nodes. In particular, the algorithms may be implemented at the nodes as logic embodied in a computer-readable medium associated with such a node that is executed using a processor or the like associated with the node.

Figure 4:
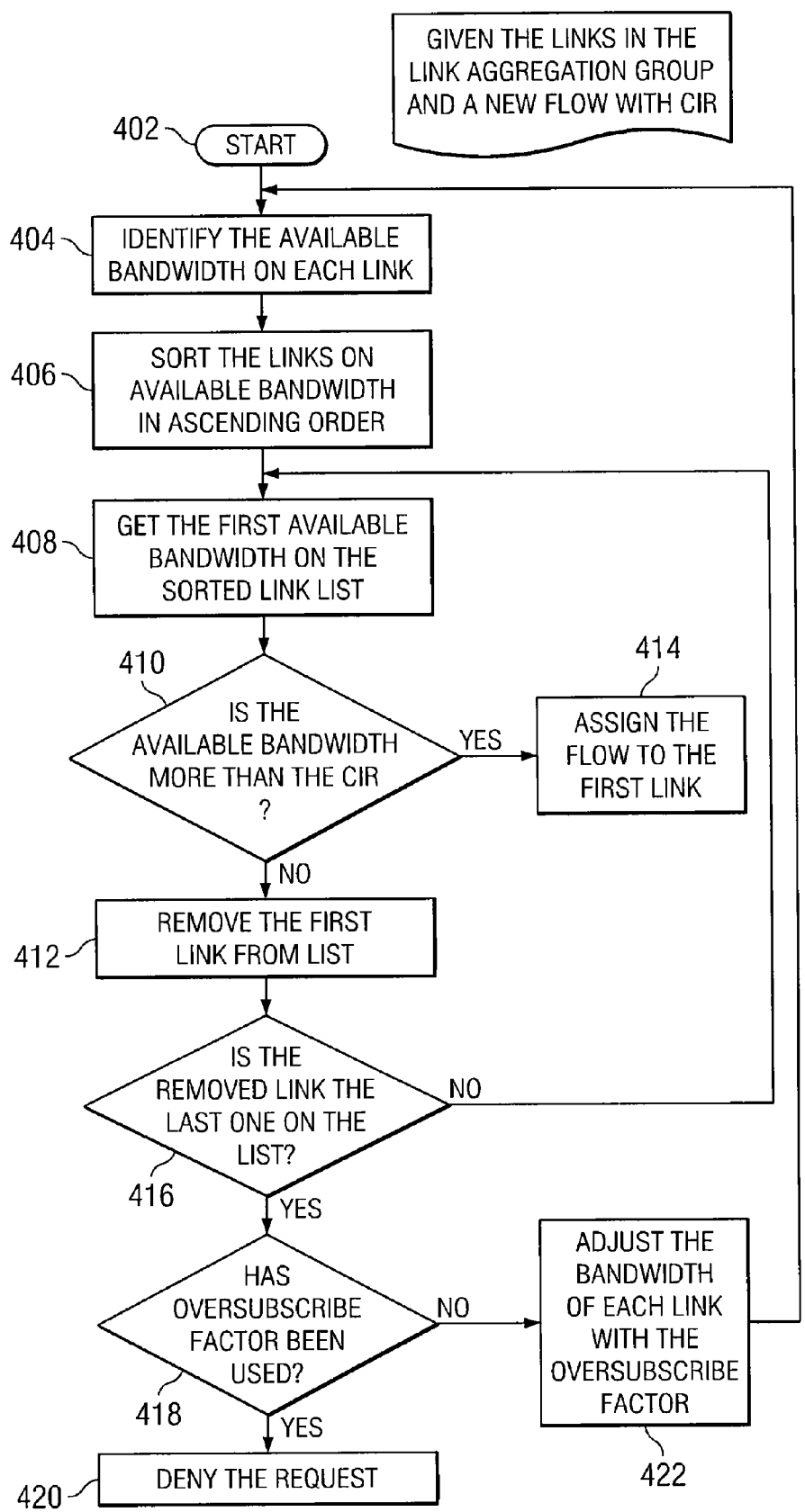
FIG. 4 illustrates a flowchart of a minimizing fragmentation algorithm.

FIG. 4 illustrates a flowchart of the minimizing fragmentation algorithm according to one embodiment. The minimizing fragmentation algorithm is configured to maximize the free contiguous bandwidth for the link aggregation group. The algorithm is further configured to distribute traffic onto multiple links associated with the link aggregation group, wherein a flow is assigned to a new link only when necessary for the appropriate amount of bandwidth. For example, the algorithm is configured to maximize the load on a particular link to which data flows have already been assigned, in order to minimize the potential of having stranded bandwidth due to fragmentation. The minimizing fragmentation algorithm will assign a new flow to a link with the least available bandwidth that can accommodate the CIR.

In step 402, the method begins where a data flow is needing to be assigned to the link aggregated group. In step 404, the algorithm is configured to identify the available bandwidth on each link of the link aggregation group. Upon determining the available bandwidth, in step 406, the algorithm sorts the links of the link aggregation group based on the available bandwidth on each link in a particular order (e.g., ascending order). In step 408, the algorithm is configured to select the first available data link on the sorted link aggregation list (e.g., the link with the least available bandwidth). In step 410, a comparison is made between the committed information rate of the packet flow and the available bandwidth of the data link. Particularly, a comparison is made whether the available bandwidth is able to accommodate the CIR of the packet. If the available bandwidth is greater than the CIR of the data flow, in step 414 the flow is assigned to the selected data link. The process of identifying the available bandwidth and assigning data flows to the available data links will continue until the value of the CIR of the next flow is greater than the available bandwidth of the selected data link.

If it is determined that the available bandwidth is less than the CIR of the next flow in step 410, the algorithm is configured to remove the first data link from the list of available bandwidth (step 412). At step 416, it is determined whether the link removed from the list is the last data link in the sorted list. If more links are available in the sorted link list, the algorithm returns to step 408 and selects the next available data link on the sorted link list. In step 416, if it is determined that the removed link is the last one in the sorted link list, the algorithm proceeds to step 418. At step 418, the algorithm determines whether an oversubscription factor has been employed. An oversubscription factor is a ratio of the configured admissible bandwidth of a port to the guaranteed bandwidth of the port. In the event that the oversubscription factor has not been used, in step 422, the algorithm adjusts the bandwidth of each data link with the oversubscribed factor. The algorithm is further configured to return to step 404 and re-identify the available bandwidth on each data link and continue to assign data flows to the available links. In step 418, if it is determined that the oversubscription factor has been used, the algorithm proceeds to step 420 and denies the request for assigning the data flow to the link.

Figure 5:
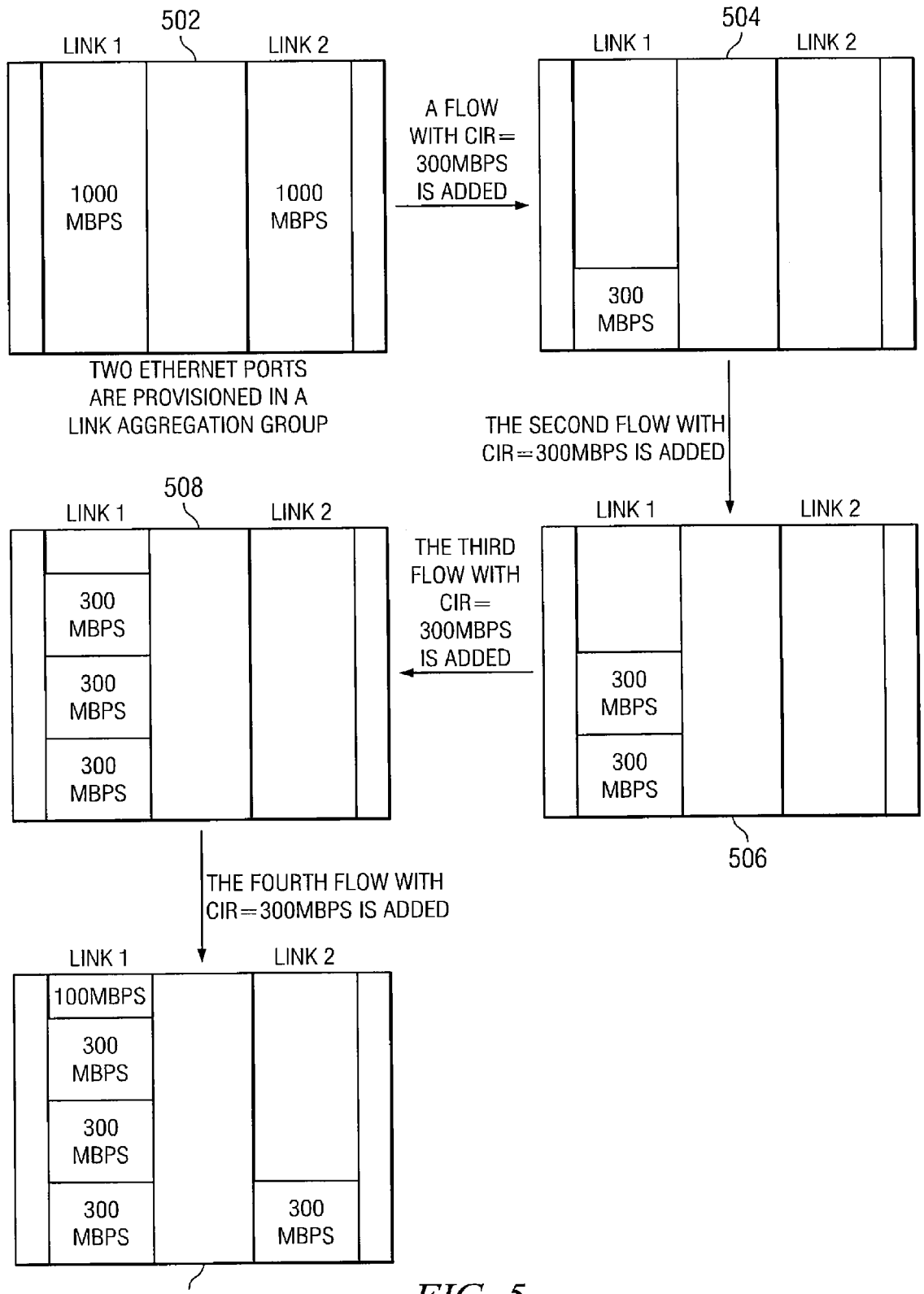
FIG. 5 illustrates a two-port embodiment of the minimizing fragmentation algorithm.

FIG. 5 illustrates a two-port embodiment of the minimizing fragmentation algorithm. The two-port embodiment of the algorithm described herein is merely an exemplary embodiment, and in other embodiments, additional ports may be employed. At step 502, link 1 and link 2 are each shown with 1000 mbps of available bandwidth. At step 504, a data flow with a CIR of 300 mbps is assigned to link 1. At step 506, a second data flow with a CIR of 300 mbps is assigned to link 1. Again, at step 508, a third flow with a CIR of 300 mbps is assigned. At the conclusion of step 508, link 1 has 100 mbps of remaining, available bandwidth. At this point, only data flows of 100 mbps or less would be able to be assigned to link 1 in this embodiment. At step 510, a fourth data flow with a CIR of 300 mbps is assigned to the link aggregation group. In this step, the data flow is assigned to link 2, wherein link 2 has 1000 mbps of available bandwidth and link 1 has only 100 mbps of available bandwidth. Therefore, in assigning traffic to the links of the link aggregation group, each flow is added to a single link until the link no longer has available bandwidth to assign the next flow based on the CIR of each flow. The minimizing fragmentation algorithm facilitates minimizing the likelihood of having fragmented bandwidth on either of the links and permits the data traffic to be distributed in such a way to allow you to assign high bandwidth flows to the available data links.

Figure 6:
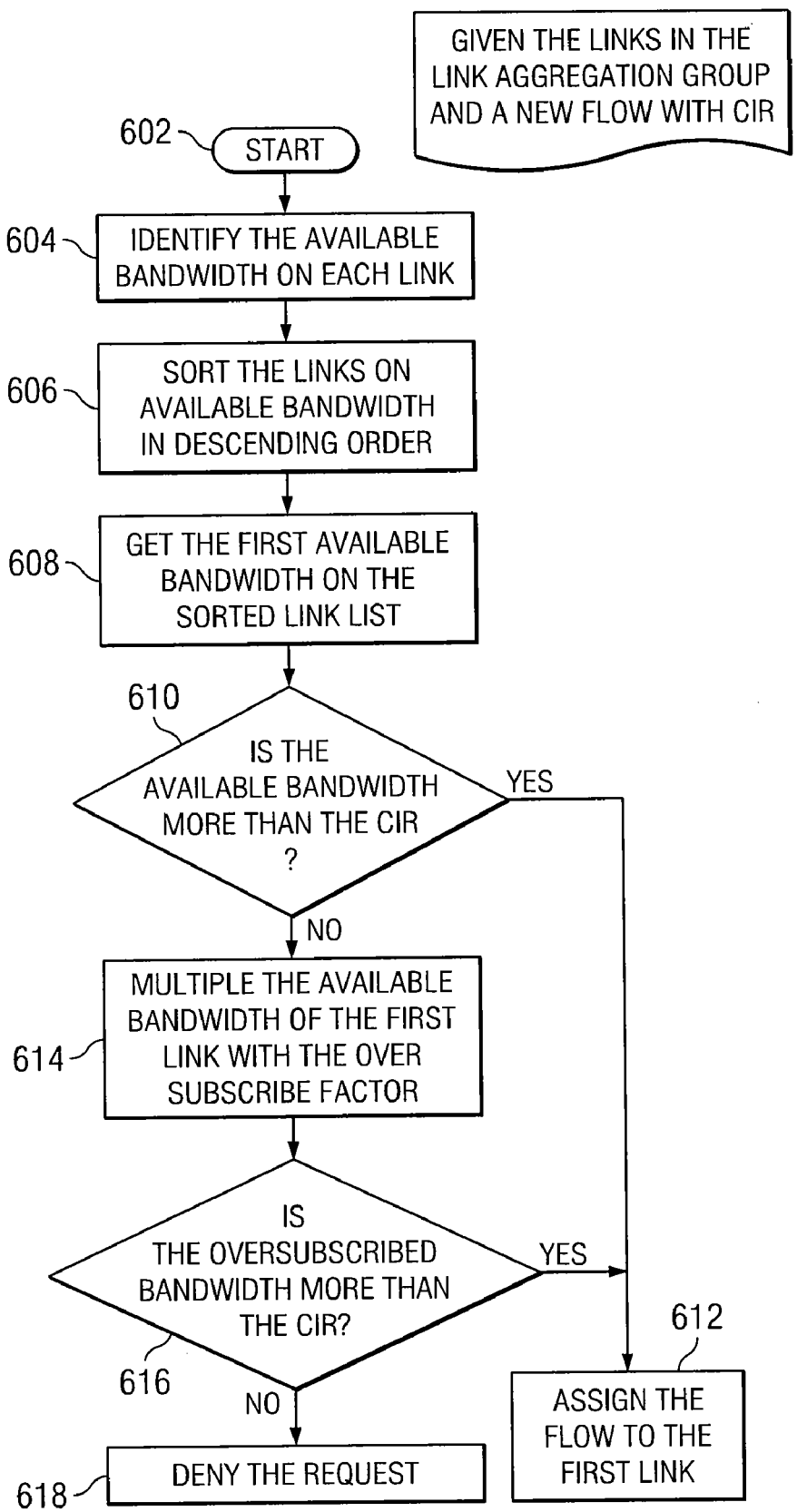
FIG. 6 illustrates a flowchart of a load balancing algorithm.

FIG. 6 illustrates a flowchart of a load balancing algorithm according to one embodiment. The load balancing algorithm is configured to minimize the variance of the bandwidth usage among all the data links in a link aggregation group, therefore, balancing the load on all of the links within the group. When a link aggregation group is configured for load balancing, the algorithm distributes traffic onto multiple links within the link aggregation group such that the sum of the CIRs of the data flows assigned to each link are balanced amongst the data links. The load balance algorithm is configured to assign a new flow to a link with the most available bandwidth. Therefore, the strategy of balancing the load on all links creates more bandwidth for best effort traffic.

At step 602, a data flow is assigned to the link aggregated group. At step 604, the load balance algorithm identifies the available bandwidth on each data link within the link aggregation group. Upon identifying the available bandwidth in step 606, the algorithm is configured to sort the data links based on the available bandwidth in a particular order (e.g., descending order). In step 608, the algorithm is configured to select the first available data link based on the sorted link list (e.g., the link with the most available bandwidth). In step 610, a determination is made on whether the available bandwidth of the data link is greater than the CIR of the flow to be added to the link. In step 612, if the available bandwidth is greater, the data flow is assigned to that link. In step 610, if the available bandwidth is determined to be less than the CIR of the data flow, the algorithm proceeds to step 614. In step 614, the load balancing algorithm is configured to multiply the available bandwidth of the first data link with the oversubscription factor. Upon performing the computation, the algorithm proceeds to step 616, wherein it is determined if the oversubscribed bandwidth is more than the CIR of the data flow. If it is determined that the oversubscribed bandwidth is more than the CIR, the flow is assigned to the selected data link. If it is determined that the oversubscribed bandwidth is less than the CIR, the algorithm proceeds to step 618 and the request to assign the data flow is denied because the remaining links in the sorted list would necessarily have less bandwidth and could not accommodate the data flow.

Figure 7:
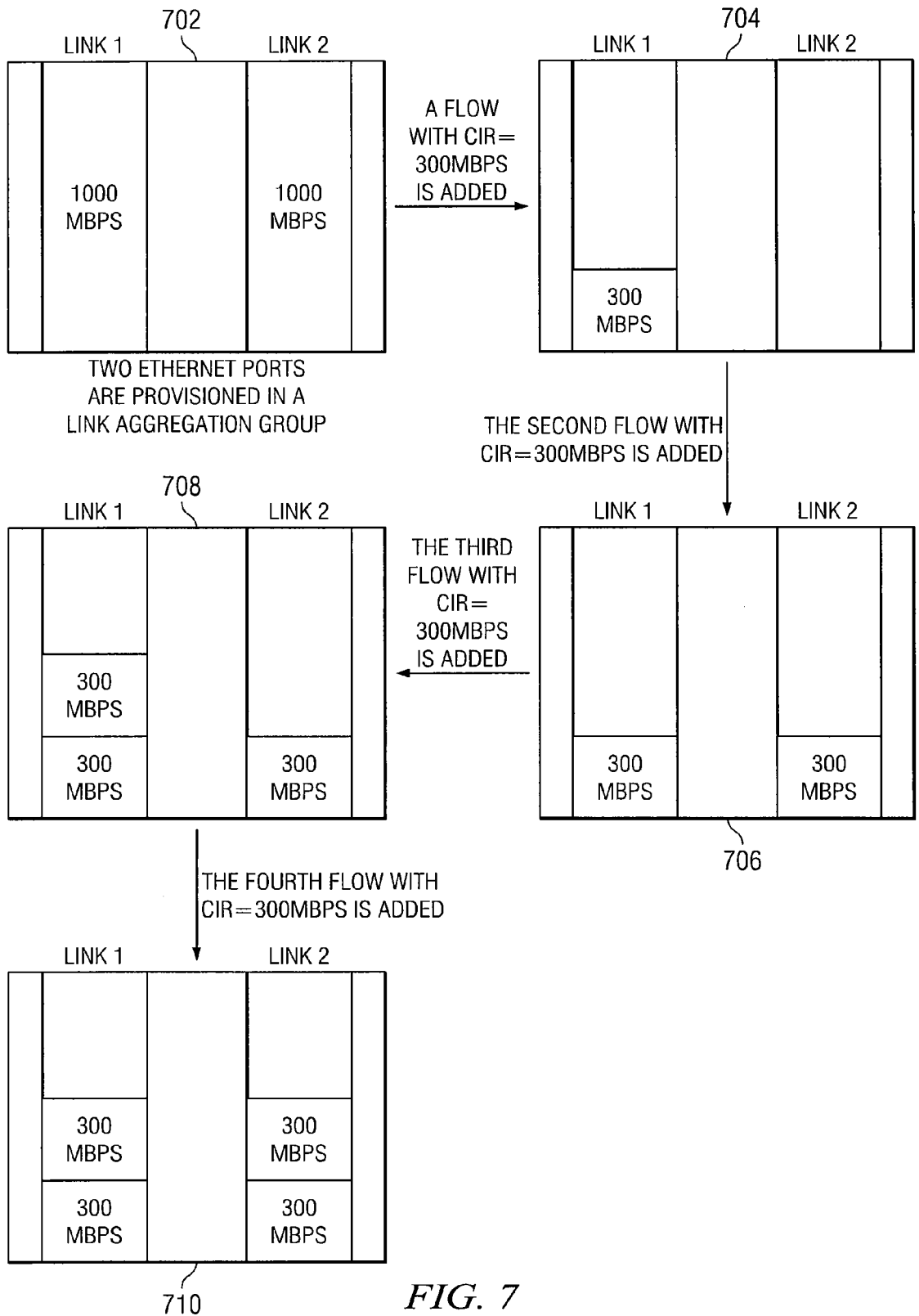
FIG. 7 illustrates a two-port embodiment of the load balancing algorithm.

FIG. 7 illustrates a two-port embodiment of the load balancing algorithm. The two-port embodiment of the algorithm described herein is merely an exemplary embodiment, and in other embodiments, additional ports may be employed. In step 702, two links are shown each having a 1000 mbps capacity. At step 704, a data flow is added to link 1. The data flow has a CIR of 300 mbps. Link 2 is left empty, having a bandwidth of 1000 mbps. At step 706, a second data flow is added to the links. A 300 mbps flow is added to link 2 because link 2 contains the most available bandwidth, therefore the data flow is balanced between links 1 and 2 of the link aggregation group, each containing a flow of 300 mbps each. At step 708, a third data flow is added to the link aggregation group. A flow of 300 mbps is added to a link 1 of the link aggregation group. Next at step 710, a fourth data flow is added. A 300 mbps flow is added to link 2 of the link aggregation group. Therefore, the load balance algorithm assigns each new flow to an appropriate link in order to provide a balanced load of packet flows and available bandwidth between the two data links.

Although particular embodiments have been described in detail, it should be understood that various other changes, substitutions, and alterations may be made hereto without departing from the spirit and scope of particular embodiments. Such changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method of optimizing bandwidth usage in a link aggregated network, comprising:
   a) identifying available bandwidth on a plurality of data links in a link aggregation group;
   b) selecting the data link with the least available bandwidth;
   c) determining whether the available bandwidth of the selected data link is less than a guaranteed bandwidth of an incoming data flow;
   d) if the available bandwidth of the selected data link is less than the guaranteed bandwidth of the incoming data flow, selecting the data link with the next least available bandwidth;
   e) repeating steps (c) and (d) until the available bandwidth of the selected data link is greater than the guaranteed bandwidth of the incoming data flow;
   f) assigning the data flow to the data link determined to have an available bandwidth greater than the guaranteed bandwidth of the incoming data flow;
   g) if none of the data links has an available bandwidth greater than or equal to the guaranteed bandwidth, determining whether an oversubscription factor has been employed and;
   h) if an oversubscription factor has not been employed, adjusting the bandwidth of each data link with the oversubscription factor and repeating steps (a) through (f).

2. The method of claim 1, further comprising denying a request to assign the data flow to the selected data link if an oversubscription factor has already been employed.

3. The method of claim 1, further comprising arranging the plurality of data links in a list according to the available bandwidth of each data link, and wherein selecting the data link with the least available bandwidth comprises selecting the first link from the list.

4. The method of claim 3, further comprising removing the selected data link from the list if the available bandwidth of the selected data link is determined to be less than the guaranteed bandwidth of the incoming data flow.

5. The method of claim 1, wherein the guaranteed bandwidth of the data flow is determined by the committed information rate of the data flow.

6. The method of claim 1, wherein the guaranteed bandwidth of the data flow is determined by the excess information rate of the data flow.

7. A method of optimizing bandwidth usage in a link aggregated network, comprising:
   identifying available bandwidth on a plurality of data links in a link aggregation group;
   selecting the data link with the most available bandwidth;
   determining whether the available bandwidth of the selected data link is less than a guaranteed bandwidth of an incoming data flow;
   if the available bandwidth of the selected data link is less than the guaranteed bandwidth of the incoming data flow:
      adjusting the bandwidth of the selected data link with an oversubscription factor, such that the adjusted bandwidth of the selected data link may be configured to accept the incoming data flow;
      determining whether the oversubscribed bandwidth of the selected data link is greater than the guaranteed bandwidth of the incoming data flow; and
      if the oversubscribed bandwidth of the selected data link is greater than the guaranteed bandwidth of the incoming data flow, assigning the data flow to the selected data link; and
   if the available bandwidth of the selected data link is greater than or equal to the guaranteed bandwidth of the incoming data flow, assigning the data flow to the selected data link.

8. The method of claim 7, further comprising arranging the plurality of data links in a list according to the available bandwidth on each data link, and wherein selecting the data link with the most available bandwidth comprises selecting the first link from the list.

9. The method of claim 7, wherein the guaranteed bandwidth of the data flows is determined by the committed information rate of the data flow.

10. The method of claim 7, wherein the guaranteed bandwidth of the data flows is determined by the excess information rate of the data flow.

11. Logic for optimizing bandwidth usage in a link aggregated network, the logic embodied in a non-transitory computer-readable medium and operable when executed to:
   a) identify available bandwidth on a plurality of data links in a link aggregation group;
   b) select the data link with the least available bandwidth;
   c) determine whether the available bandwidth of the selected data link is less than a guaranteed bandwidth of an incoming data flow;
   d) if the available bandwidth of the selected data link is less than the guaranteed bandwidth of the incoming data flow, select the data link with the next least available bandwidth;
   e) repeat steps (c) and (d) until the available bandwidth of the selected data link is greater than the guaranteed bandwidth of the incoming data flow;
   f) assign the data flow to the data link determined to have an available bandwidth greater than the guaranteed bandwidth of the incoming data flow;
   g) if none of the data links has an available bandwidth greater than or equal to the guaranteed bandwidth, determine whether an oversubscription factor has been employed; and
   h) if an oversubscription factor has not been employed, adjust the bandwidth of each data link with the oversubscription factor and repeating steps (a) through (f).

12. The logic of claim 11, further operable to deny a request to assign the data flow to the selected data link if an oversubscription factor has already been employed.

13. The logic of claim 11, further operable to arrange the plurality of data links in a list according to the available bandwidth of each data link, and wherein selecting the data link with the least available bandwidth comprises selecting the first link from the list.

14. The logic of claim 13, further operable to remove the selected data link from the list if the available bandwidth of the selected data link is determined to be less than the guaranteed bandwidth of the incoming data flow.

15. The logic of claim 11, wherein the guaranteed bandwidth of the data flow is determined by the committed information rate of the data flow.

16. The logic of claim 11, wherein the guaranteed bandwidth of the data flow is determined by the excess information rate of the data flow.

17. Logic for optimizing bandwidth usage in a link aggregated network, the logic embodied in a non-transitory computer-readable medium and operable when executed to:
   identify available bandwidth on a plurality of data links in a link aggregation group;
   select the data link with the most available bandwidth;
   determine whether the available bandwidth of the selected data link is less than a guaranteed bandwidth of an incoming data flow;
   if the available bandwidth of the selected data link is less than the guaranteed bandwidth of the incoming data flow:
      adjust the bandwidth of the selected data link with an oversubscription factor, such that the adjusted bandwidth of the selected data link may be configured to accept the incoming data flow;
      determine whether the oversubscribed bandwidth of the selected data link is greater than the guaranteed bandwidth of the incoming data flow; and
      if the oversubscribed bandwidth of the selected data link is greater than the guaranteed bandwidth of the incoming data flow, assign the data flow to the selected data link; and
   if the available bandwidth of the selected data link is greater than or equal to the guaranteed bandwidth of the incoming data flow, assign the data flow to the selected data link.

18. The logic of claim 17, further operable to arrange the plurality of data links in a list according to the available bandwidth on each data link, and wherein selecting the data link with the most available bandwidth comprises selecting the first link from the list.

19. The logic of claim 17, wherein the guaranteed bandwidth of the data flows is determined by the committed information rate of the data flow.

20. The logic of claim 17, wherein the guaranteed bandwidth of the data flows is determined by the excess information rate of the data flow.

* * * * *